United States Patent
Rozmus et al.

[15] 3,680,761
[45] Aug. 1, 1972

[54] FINE WIRE BUTT WELDER

[72] Inventors: Walter J. Rozmus, Hubbardsville; Matt T. Rozmus, Barneveld, both of N.Y.

[73] Assignee: Kelsey-Hayes Company

[22] Filed: July 28, 1970

[21] Appl. No.: 64,894

Related U.S. Application Data

[62] Division of Ser. No. 766,813, Oct. 11, 1968, Pat. No. 3,606,131.

[52] U.S. Cl..................................228/3, 29/470.1
[51] Int. Cl. ...........................................B23k 21/00
[58] Field of Search .......228/3, 4, 44; 29/470.1, 464, 29/505

[56] References Cited

UNITED STATES PATENTS

| | | |
|---|---|---|
| 2,923,183 | 2/1960 | Johnson..........................228/3 |
| 3,044,328 | 7/1962 | Zysk.................................228/3 |
| 3,340,596 | 9/1967 | Rozmus........................228/3 X |

*Primary Examiner*—John F. Campbell
*Assistant Examiner*—R. J. Craig
*Attorney*—Harness, Dickey & Pierce

[57] ABSTRACT

A fine wire welding machine for cold butt welding small diameter wires through a multiple upset technique. The machine includes a loading mechanism for accurately positioning the fine wire strands for subsequent engagement with the welding dies and the welding dies are movable in a plane parallel to their abutting faces for shearing the wires and aligning the end of the wire from one spool with the end of the wire from another spool for the subsequent welding technique. An improved operating mechanism is incorporated for operating the die actuating V-blocks and for operating the dies and gripping means in a predetermined sequence. The operating mechanism includes means for adjusting the opening of the dies and for permitting retraction of the dies for the loading procedure.

9 Claims, 15 Drawing Figures

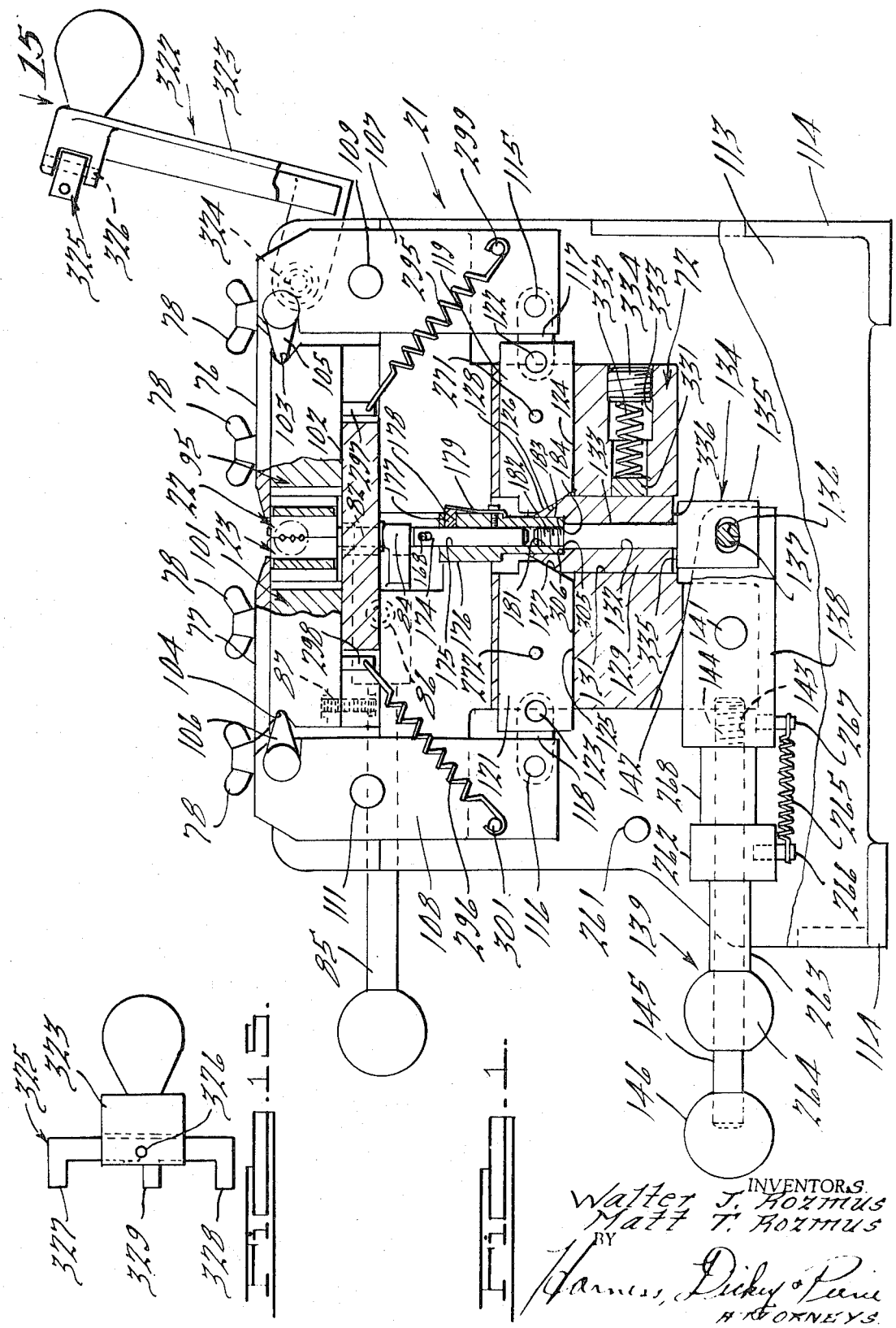

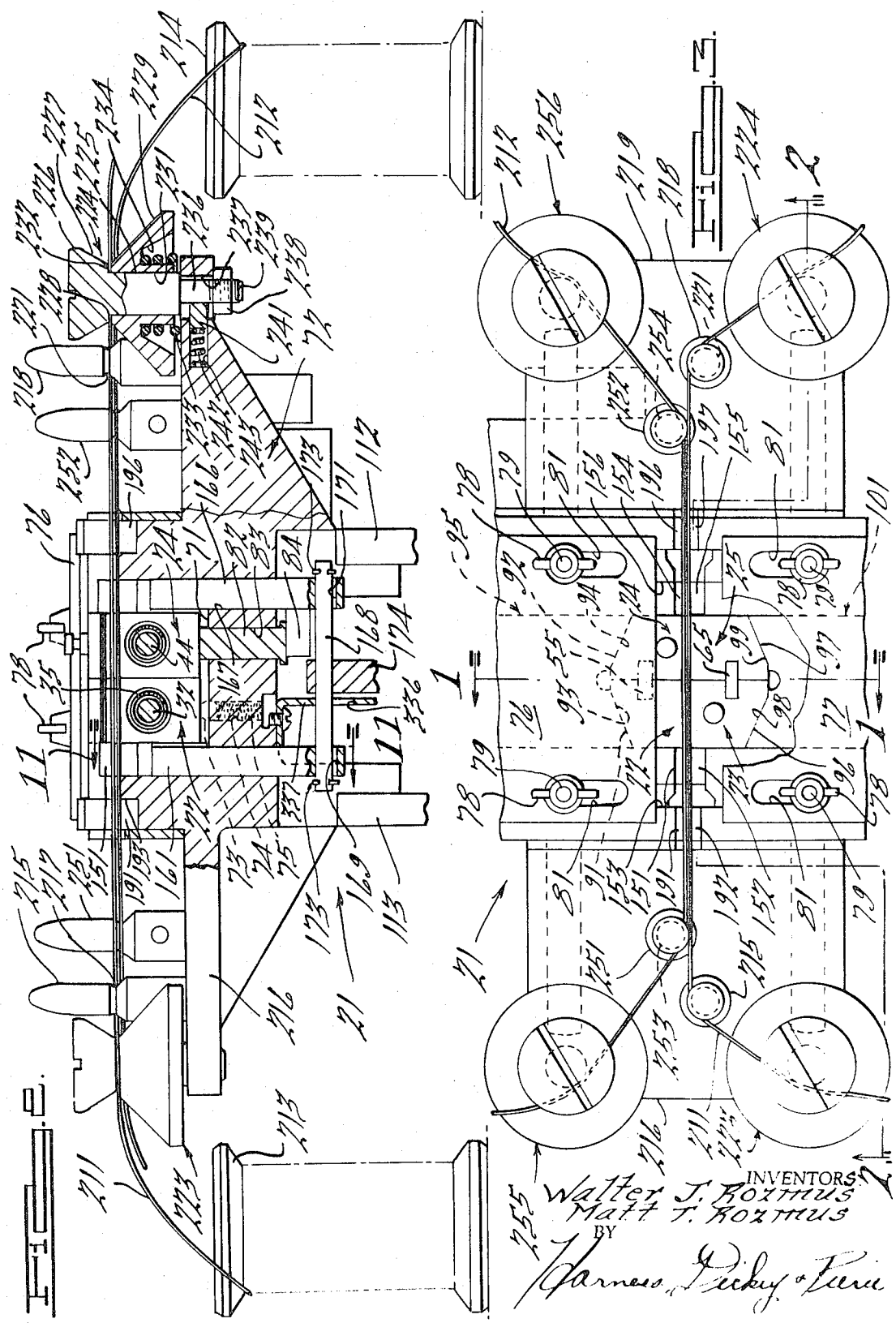

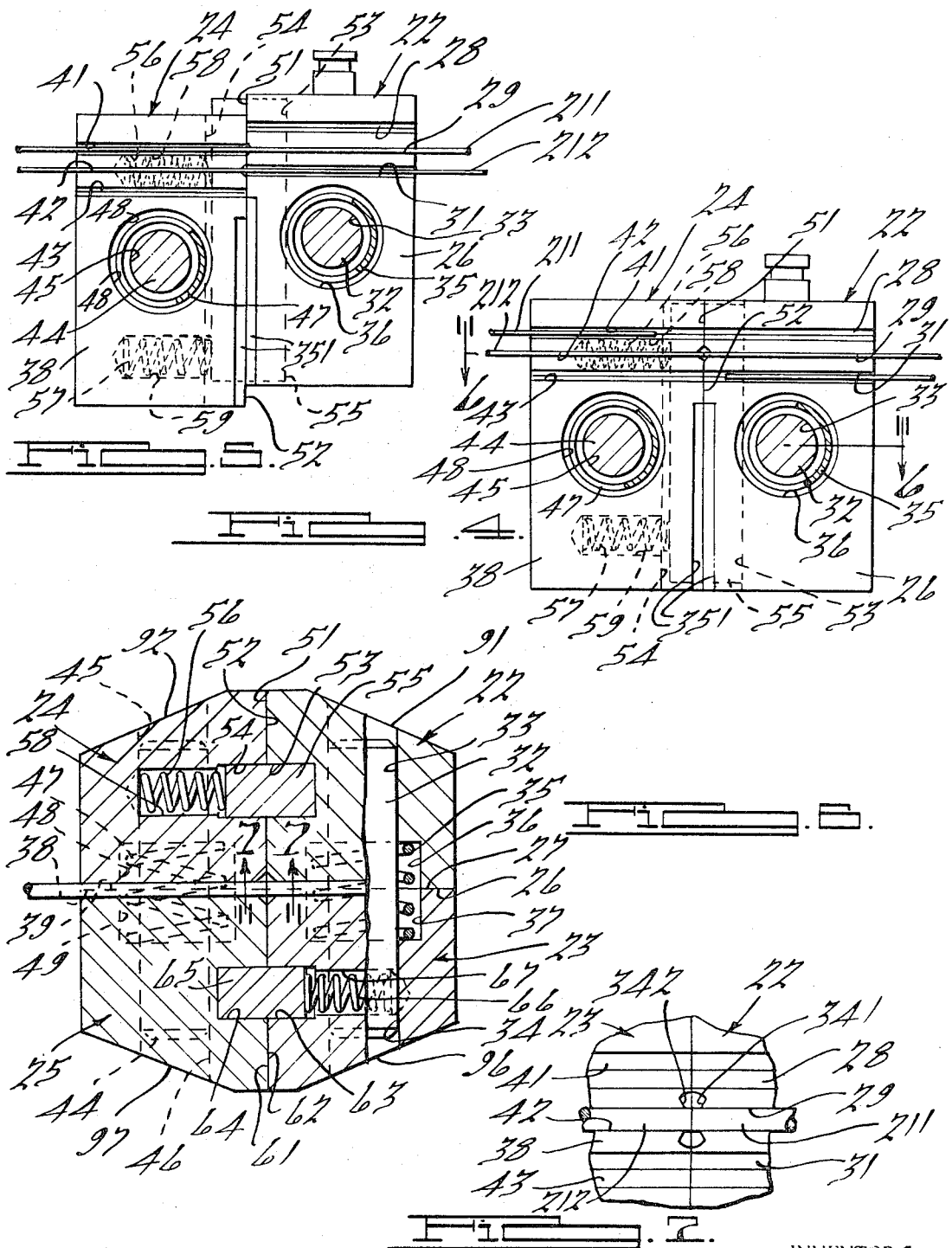

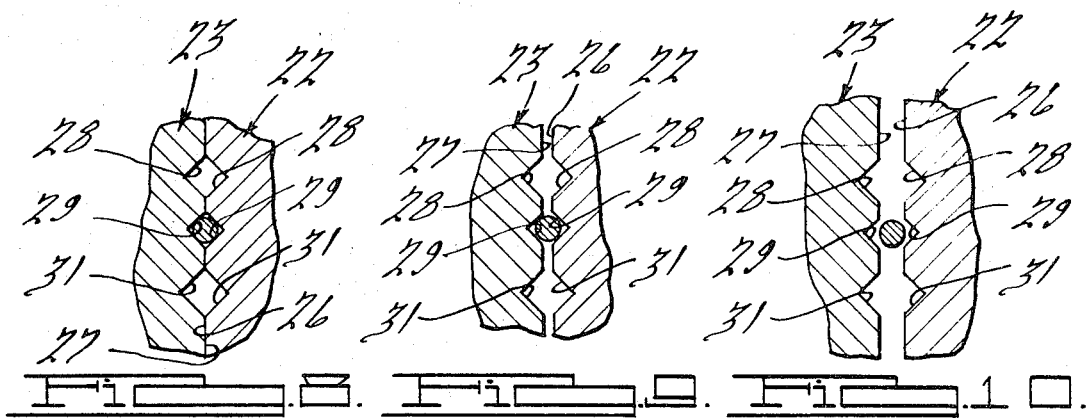
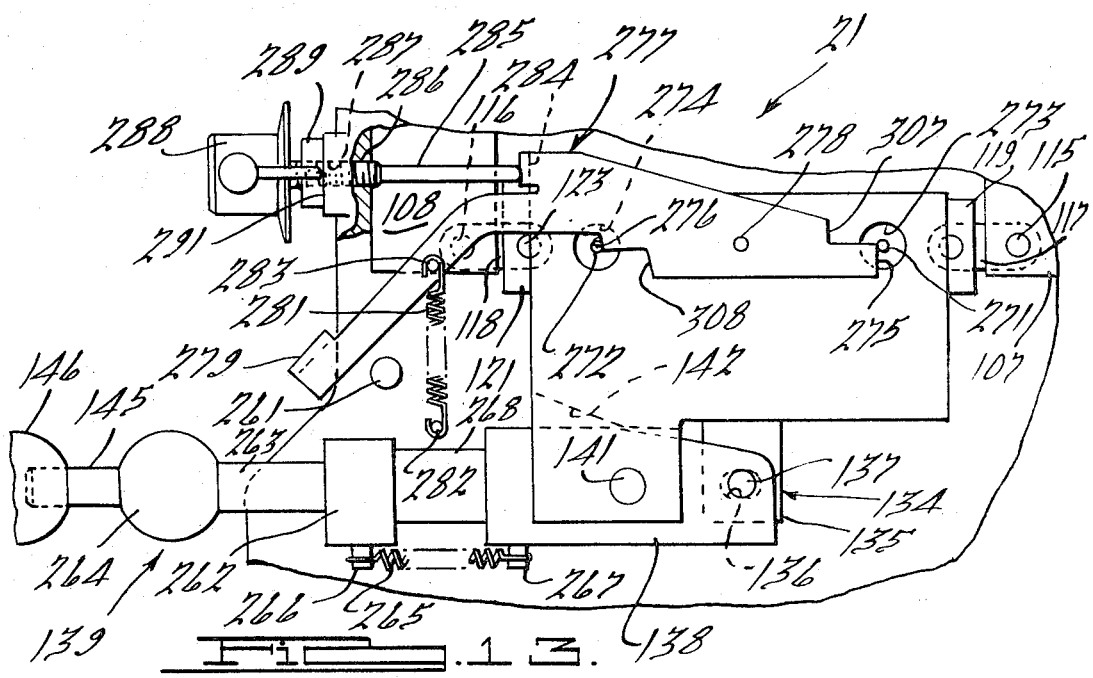

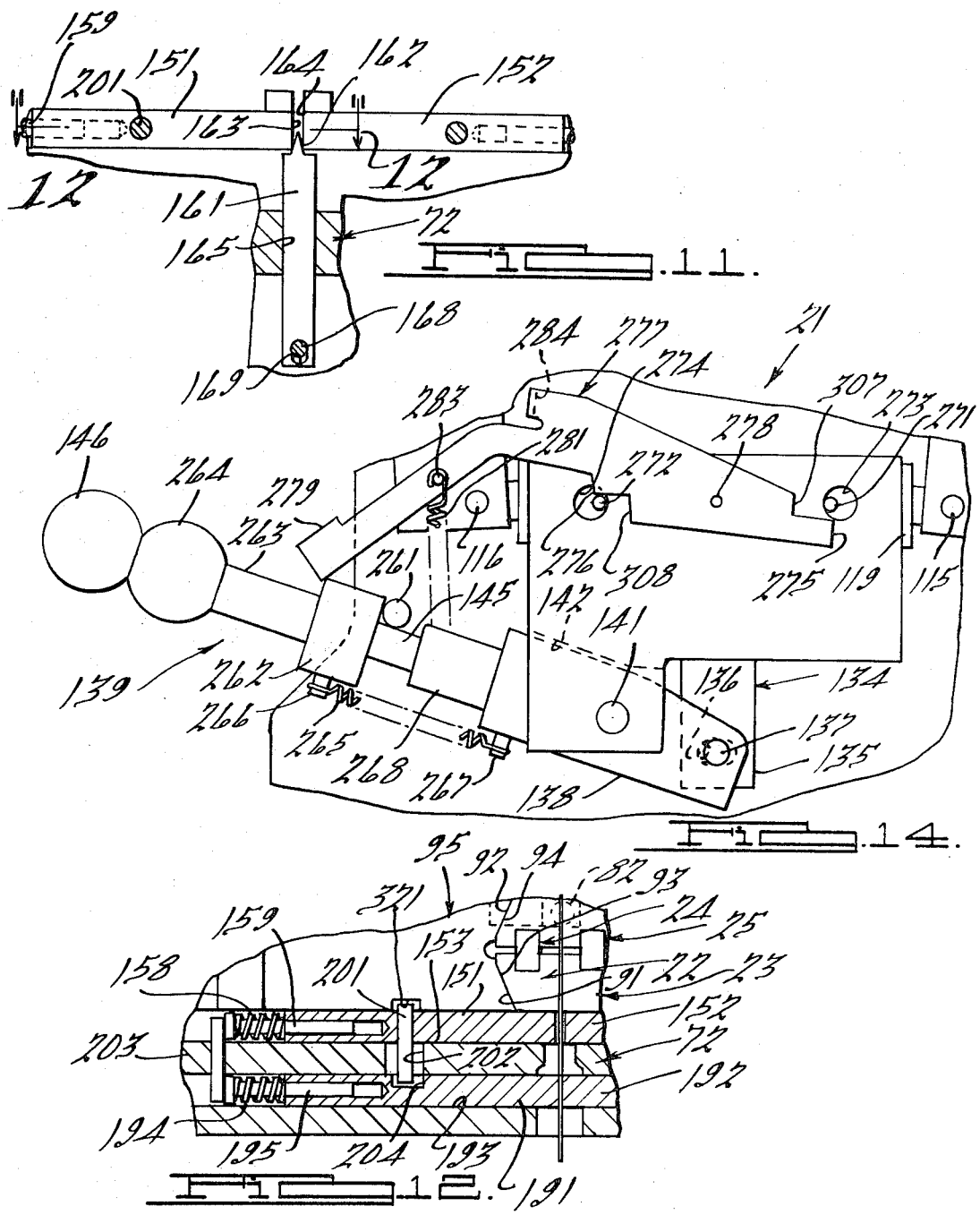

FINE WIRE BUTT WELDER

CROSS REFERENCE TO RELATED APPLICATION

This application is a division of our application entitled "Fine Wire Butt Welder," Ser. No. 766,813, filed Oct. 11, 1968 now U.S. Pat. No. 3,606,131 granted Sept. 20, 1971.

SUMMARY OF THE INVENTION

This invention relates to an improved machine for working fine wires and more particularly to an improved fine wire butt welding machine.

U.S. Pat. No. 3,106,013, entitled "Method of Pressure Welding Metals," issued Oct. 8, 1963, in the name of Walter J. Rozmus, discloses a method of cold butt welding wires or other forms of thin material through a multiple upset process. A production machine for accomplishing this method is disclosed in U.S. Pat. No. 3,309,766, entitled "Cold Pressure Welding Apparatus and Method," issued Mar. 21, 1967, also in the name of Walter J. Rozmus. Although the methods and machines disclosed in the aforenoted patents have met with a substantial degree of commercial success, the machines disclosed therein are not completely satisfactory for performing a multiple upset welding technique on extremely small diameter wires or thin gauge materials. Although the techniques and general mechanism disclosed in those patents are very useful, certain technical problems are encountered when dealing with wires in the range of 0.005 to 0.003 inches in diameter or even smaller. For example, in the aforenoted welding procedures, pairs of dies are employed for selectively gripping the wire ends and for upsetting the wire ends. Each of the dies of the pairs is formed with grooves, which grooves coact to define a wire receiving cavity when the pairs of dies are in their closed or gripping positions. It is extremely difficult for the common workman to accurately thread a fine wire through such dies. Unless the wire is accurately threaded, it will be incorrectly located and damaged when the dies move together. In addition, buckling of the wire during the threading technique also is a problem when dealing with small diameter wires.

It is therefore, a principal object of this invention to provide an improved machine for cold butt welding fine wires through a multiple upset technique.

It is another object of this invention to provide a fine wire welding machine embodying an improved method for loading the wire.

In addition to the difficulty in actually threading a fine wire through the welding dies, it is essential that the ends of the wires be accurately located at the die faces to insure good welds. Even through the use of magnifying glasses, it is almost impossible to accurately position the ends of the individual wires during the loading procedure. Although the aforenoted U.S. Pat. No. 3,106,013 discloses a cutting apparatus for insuring accurate location of the wire ends, this mechanism adds considerable cost to a production machine.

It is, therefore, another object of this invention to provide an improved apparatus for cutting the wires in a fine wire butt welding machine.

It is a further object of this invention to provide a fine wire butt welding machine wherein the wire ends are sheared during the loading procedure.

In connection with the aforenoted object, the pairs of dies themselves are used as a cutting tool to accurately shear the ends of the wires when they are gripped in the dies. In a conventional butt welding apparatus as that shown in the aforementioned U.S. Pat. No. 3,309,766, the pairs of dies move relative to each other in two directions. In connection with the improved shearing method disclosed in this application, the pairs of dies move relative to each other in three directions. It is, however, essential to accurately maintain the relationship between the dies even though they undergo these diverse relative movements.

It is, therefore, another object of this invention to provide an improved die set for a fine wire butt welding machine.

It is a yet further object of the invention to provide an improved die set having four dies arranged in pairs and movable in three directions relative to each other.

In the welding techniques described in the aforenoted patents, the dies of the pairs move toward each other to grip the individual wire ends prior to the movement of the pairs of dies toward each other to effect the upsetting. That is, the wire is alternately grasped and released by the pairs of dies during the welding techniques. Since the dies are actuated by a V-block, as shown in the aforenoted U.S. Pat. No. 3,309,766, the dies of each pair move toward and away from each other simultaneously with their movement toward the dies of the other pair. Hence, there is some tendency for the dies to exert a tensile force upon the partially welded wire ends during the retraction of the dies and prior to the next upset. Although that patent discloses a gripping mechanism for creating a drag on the wire and for tending to reduce the tearing apart of the partially welded wire ends, this drag is continuously exerted. When working with extremely fine wires, the use of such a continuous gripping action may result in bending of the wire in the area between the dies and the gripping mechanism.

It is, therefore, another object of this invention to provide an improved fine wire butt welding machine embodying dies and gripping means wherein the sequence of opening and closing of the dies and gripping means is accurately controlled.

It is another object of the invention to provide an improved mechanism for accomplishing the aforenoted sequence of operation.

In connection with the relationship of the gripping mechanism and the dies, the aforenoted U.S. Pat. No. 3,309,766 embodied a gripping mechanism in which a pair of pivotally supported restraining members which resembled gates and which acted upon the wire as a one-way brake. Due to the pivotal movement of this mechanism, a clearance was required between the adjacent dies and the gripping mechanism. With such a clearance, bending of the wire might result in the area between the gripping mechanism and the dies.

It is, therefore, another object of this invention to provide an improved gripping mechanism for a fine wire working machine.

It is a further object of the invention to provide a gripping mechanism for a fine wire butt welding machine that may be disposed immediately adjacent the welding dies.

In the aforenoted U.S. Pat. No. 3,309,766 the disclosed mechanism provides for two retracted positions for the dies of each pair. In one position, the grip on the wire is released but the die faces are not sufficiently far apart to permit the wire to fall between the faces. In the other retracted position, the die faces are spaced apart a distance greater than the diameter of the wire so that the wire may be removed. If the machine is to be used with a wide range of wire sizes, means should be provided for adjusting this first intermediate position.

Therefore, it is another object of the invention to provide a fine wire butt welding machine capable of handling a wide variety of wire diameters.

It is another object of the invention to provide an improved mechanism for adjusting the normal retracted position of the dies of a fine wire butt welding machine.

SUMMARY OF THE INVENTION

A fine wire working machine embodying a first feature of the invention is particularly adapted for a simplified loading procedure. The machine includes a first and a second pair of dies as well as means for supporting the dies of each of the pairs for relative movement toward and away from each other from an opened position to a gripping position. Each of the dies defines first and second longitudinally extending grooves with the grooves of each of the pairs of dies being aligned respectively with each other when the pairs of dies are in their gripping position to define respective first and second wire receiving cavities. A first pair of wire locating and holding devices is disposed in aligned relationship with one set of the longitudinally extending grooves of the dies and is located at opposite longitudinal ends of the machine. The first pair of wire locating and holding devices is adapted to hold a first fine wire in accurately aligned relation with respect to the one set of grooves of the dies when the dies are in their opened position for gripping of the first wire accurately within one of the wire receiving cavities of each of the pair of dies when the dies are moved to their gripping position. A second pair of wire locating and holding devices are disposed in accurately aligned relationship with the other set of longitudinally extending grooves of the dies and is located at opposite longitudinal ends of the machine. This other set of locating and holding devices is also adapted to hold a second fine wire in accurately aligned relationship when the dies are in their opened position for gripping of the second wire within the other wire receiving cavity of each of the pairs of dies when the dies are moved to their gripping positions.

A fine wire working machine embodying another feature of this invention is particularly adapted for shearing the ends of the wire during the loading technique. Such a machine also includes first and second pairs of dies with the dies of each pair being relatively movable between an opened and a gripping position. Each of the dies also defines first and second longitudinally extending grooves with the grooves of the pairs of dies being aligned respectively with each other when the pairs of dies are in their gripping positions for defining respective first and second wire receiving cavities. The pairs of dies have respective surfaces disposed substantially normally to the axes of the wire receiving cavities with the respective surfaces being juxtaposed to each other. Means are provided for supporting the second pair of dies for movement in a direction parallel to its respective surface from a deflected loading position wherein the second wire receiving cavity of the second pair of dies is aligned with the first wire receiving cavity of the first pair of dies and wherein the first wire receiving cavity of the second pair of dies is aligned with the second wire receiving cavity of the first pair of dies to a normal position wherein the second wire receiving cavity of the second pair of dies is aligned with the second wire receiving cavity of the first pair of dies for shearing wires received in the wire receiving cavities and for bringing the sheared wire ends of one wire received in the second wire receiving cavity of the second pair of dies into abutting relationship with a wire received in the second wire receiving cavity of the first pair of dies.

A still further feature of the invention is adapted to be embodied in a die set for a fine wire butt welding machine. The die set comprises first and second dies having first respective facing surfaces in which first and second wire receiving grooves are formed. First pin means extend substantially normally to the first surfaces of the first and second dies and are received in bores formed in each of the first and second dies for aligning the first and second wire receiving grooves of the first die with respect to those of the second die and for restraining movement of the first and second dies relative to each other along the axis of the first pin means. Third and fourth dies are provided which, like the first and second dies, have first respective facing surfaces in which first and second wire receiving grooves are formed. A second pin means is received in bores formed in each of the third and fourth dies for aligning the first and second wire receiving grooves of the third die with those of the fourth die and for restraining movement of the third and fourth dies relative to each other along the axis of the pin means. The first and third dies have second respective facing surfaces. A first key is received in keyway means formed in the second surfaces of the first and third dies and extends normally to the second surfaces and to the axis of the first and second pin means. The key and keyway connection between the first and third dies accurately aligns the first and third dies relative to each other while permitting movement of the first and third dies relative to each other in a direction parallel to the plane of the second facing surfaces and in a direction perpendicular to these second surfaces. The second and fourth dies also have second respective facing surfaces and a second key coacts with keyway means formed in the second facing surfaces of the second and fourth dies for aligning these dies relative to each other and for restraining their movement in a direction parallel to the facing surfaces and perpendicular to these surfaces.

A still further feature of the invention is adapted to be embodied in a fine wire butt welding machine embodying the multiple upset process wherein the wires are held at all times and in such a manner as to preclude their bending. With such a machine, a first and second pair of welding dies are supported for movement in two directions. The dies of each pair are formed with longitudinally extending grooves and are movable toward and away from each other. In their closed or gripping position the grooves of the individual pairs define wire receiving cavities. The pairs of dies are also movable away from and toward each other to accomplish a multiple upset welding technique. First wire gripping means is juxtaposed to the first pair of dies and second wire gripping means is juxtaposed to the second pair of dies. The wire gripping means are each movable between a released position wherein a fine wire may pass therebetween and a gripping position wherein the wire is restrained from movement. Actuating means are provided for moving the gripping means from their gripping position to their retracted position and for moving the pairs of dies from their released position to their gripping position and then toward each other to their welding position upon movement of the actuating means from a first position to a second position.

An actuating mechanism embodying a still further feature of the invention is particularly adapted for use in a sequentially operated fine wire butt welding mechanism of the type described in the immediately preceding paragraph. Such an actuating mechanism includes an actuating rod supported for reciprocation between a normal position and an operating position. A first cam is also movable between a normal position and an operative position and lost motion means operatively connect the actuating rod to the first cam for moving the first cam from its normal position to its operative position after the actuating rod has been moved from its normal position to a first intermediate position and upon movement of the actuating rod from the first intermediate position to its operative position. The lost motion means also is effective to move the first cam from its operative position to its normal position after the actuating rod has been moved from its operative position to a second intermediate position and upon movement of the actuating rod from the second intermediate position to its normal position. A frictional brake acts upon the first cam for restraining the first cam in its normal position upon movement of the actuating rod from its normal position to its first intermediate position and for restraining the first cam in its operative position upon movement of the actuating rod from its operative position to its second intermediate position. A second cam movable between a normal position and an operative position is operatively interconnected with the actuating rod by means including friction clutch means for movement of the second cam upon movement of the actuating rod.

Yet another object of this invention is adapted to be embodied in a fine wire butt welding machine of the multiple upset type for precluding bending of the fine wires. In such a machine, the individual dies of first and second pairs of dies are supported for movement toward and away from each other from a released to a gripping position. In addition, the pairs of dies are movable toward and away from each other from a retracted to a welding position. The dies have longitudinally extending grooves with the grooves of the pairs of dies defining wire receiving cavities when the dies are in their gripping positions. First and second pairs of gripping means are juxtaposed to the first and second pairs of dies respectively when the pairs of dies are in their retracted position. The pairs of gripping means are movable between an opened and a closed position in a direction parallel to the direction of movement of the dies of the pairs of dies between their opened and gripping positions.

An even further feature of the invention is adapted to be embodied in an actuating mechanism for a fine wire butt welding machine. The actuating mechanism comprises first and second die actuating V-blocks supported for reciprocation toward and away from each other. A pair of operating members are supported for reciprocation in a direction substantially parallel to the direction of reciprocation of the V-blocks. A cam member is supported for reciprocation and engages means on the operating members for moving the operating members upon movement of the cam member. A pair of operating levers are supported for pivotal movement about respective pivot axes that extend parallel to the direction of movement of the operating members and of the V-blocks. Each of the operating members is pivotally connected to a respective one of the operating levers for pivoting the operating levers upon movement of the operating members. Means are provided to transmit pivotal movement of each of the operating levers into movement of a respective one of the V-blocks.

An even further feature of the invention is particularly adapted to be embodied in a fine wire working machine for adjustably limiting the stroke of certain of the members. In such an embodiment, a pair of operating members are supported for reciprocation and a pair of abutments are fixed each to a respective one of the operating members. A stop member is supported for pivotal movement about a pivot axis and has a pair of stop surfaces each juxtaposed to a respective one of the abutments and adapted to be engaged thereby for limiting the degree of movement of the operating members in one direction. Means are provided for adjusting the angular position of the stop member about its pivot axis. The stop surfaces of the stop member are oriented to alter the degree of movement of the operating members in the one direction in response to the angular adjustment of the stop member.

Another feature of the invention is adapted to be embodied in a fine wire butt welding machine or the like for use in its operating handle mechanism. In connection with this feature, an operating handle is supported for pivotal movement. Abutment means supported on the operating handle for movement between a normal position and a reset position is adapted to engage a fixed stop when the abutment means is in its normal position for limiting the degree of movement of the operating handle in one direction. A limit stop mechanism is also incorporated and has an operating portion juxtaposed to the fixed stop. The abutment means is displaced from the fixed stop when in its reset position for permitting further movement of the operating handle in the one direction. The abutment means is engageable with the operating portion of the limit stop mechanism when in its reset position for actuating the limit stop mechanism upon further movement of the operating handle.

BRIEF DESCRIPTION OF THE DRAWINGS

FIG. 1 is a transverse cross-sectional view of a fine wire butt welding apparatus embodying this invention and taken along the line 1—1 of FIG. 3.

FIG. 2 is a cross-sectional view taken transversely to the view of FIG. 1 and generally along the line 2—2 of FIG. 3.

FIG. 3 is a top plan view, with a portion broken away, of the butt welding machine.

FIG. 4 is an enlarged inverted cross-sectional view of the die set in a position corresponding to that shown in FIG. 2.

FIG. 5 is an enlarged cross-sectional view, in part similar to FIG. 4, and shows the die set at an intermediate step during the loading procedure.

FIG. 6 is a cross-sectional view taken along the line 6—6 of FIG. 4.

FIG. 7 is a further enlarged cross-sectional view taken along the line 7—7 of FIG. 6.

FIG. 8 is an enlarged view of the encircled area in FIG. 1 showing the wire receiving cavities of the die set.

FIG. 9 is a cross-sectional view, in part similar to FIG. 8, showing the dies in a released position.

FIG. 10 is a cross-sectional view, in part similar to FIGS. 8 and 9, showing the dies in their fully released or loading position.

FIG. 11 is a cross-sectional view taken along the line 11—11 of FIG. 2 and shows the gripper actuating mechanism.

FIG. 12 is a cross-sectional view taken along the line 12—12 of FIG. 11.

FIG. 13 is a side elevational view, with portions broken away, of the operating handle mechanism.

FIG. 14 is a side elevational view, in part similar to FIG. 13, showing the operating handle mechanism in its loading position.

FIG. 15 is an end view of the die depressing lever taken generally in the direction of the arrow 15 in FIG. 1.

DETAILED DESCRIPTION OF THE PREFERRED EMBODIMENT

In the drawings, the reference numeral 21 represents generally a multiple upset fine wire butt welding machine embodying this invention. It is to be understood that certain of the features of the invention may be used in conjunction with other types of fine wire working machines or with other types of machines. The machine 21 is, however, particularly adapted for forming multiple upset cold butt welds on ultra fine wires; that is, wires having a diameter in the range of about 0.003 to 0.005 inches diameter, or even smaller.

The machine 21 includes a first pair of welding dies 22 and 23 and a second pair of welding dies 24 and 25. These dies are shown in most detail in FIGS. 4 through 7 and will be described by particular reference to those figures. The dies 22 and 23 have facing surfaces 26 and 27, respectively. First, second and third grooves 28, 29 and 31 are formed in each of the surfaces 26 and 27. The grooves 28 and 31 are of larger size than the grooves 29 and preferably the grooves have a configuration of the type disclosed in the U.S. Pat. No. 3,336,655, entitled "Die structure," issued Aug. 27, 1967, in the name of Walter J. Rozmus. The grooves 29 are sized so as to accurately grip the wire diameter or range of diameters to be welded while, as has been noted, the grooves 28 and 31 are larger in size.

A first pin 32 extends within aligned bores 33 and 34 formed in the dies 22 and 23, respectively. The bores 33 and 34 are disposed perpendicularly to the surfaces 26 and 27 and the pin 32 coacts with the bores 33 and 34 to accurately align the grooves 28, 29 and 31 in the die 22 with the like grooves formed in the die 23. The pin connection between the dies 22 and 23, however, permits the dies 22 and 23 to move in a direction perpendicular to the surfaces 26 and 27 from an opened position to a closed, gripping position wherein the surfaces 26 and 27 are abuttingly engaged. In this closed, gripping position, the respective grooves 28, 29 and 31 of the dies 22 and 23 coact to define longitudinally extending wire receiving cavities. A coil compression spring 35 encircles the pin 32 and is received in enlarged counterbores 36 and 37 formed in the dies 22 and 23 adjacent the surfaces 26 and 27. The coil spring 35 normally urges the die surfaces 26 and 27 away from each other.

The dies 24 and 25 of the second pair of dies also have facing surfaces 38 and 39 in which first, second and third grooves 41, 42 and 43 are formed. The grooves 41 and 43 are larger than the groove 42. The respective grooves coact to define first, second and third wire receiving cavities when the surfaces 38 and 39 are in abutting relationship. Grooves 42 are sized to define a cavity which will closely engage the wire to be welded while the grooves 41 and 43 define larger cavities.

A second pin 44 extends through complementary bores 45 and 46 formed in the dies 24 and 25 perpendicularly to the surfaces 38 and 39. The pin 44 and bores 45 and 46 coact to align the respective grooves 41, 42 and 43 of the dies 24 and 25 and to constrain the dies 24 and 25 for movement relative to each other in a direction perpendicular to the surfaces 38 and 39 from an opened position to a closed, gripping position wherein the surfaces 38 and 39 abut each other. A coil compression spring 47 is received in counterbores 48 and 49 formed in the dies 24 and 25, respectively, and encircles the pin 44 for urging the dies 24 and 25 to their opened positions.

The dies 22 and 24 have facing surfaces 51 and 52, respectively, which surfaces are disposed at right angles to the surfaces 26 and 38. Keyways 53 and 54 are formed in the dies 22 and 24 at the surfaces 51 and 52. The keyways 53 and 54 extend perpendicularly to the surfaces 51 and 52 and define a longitudinal axis that is parallel to these surfaces. A key 55 is received in the keyways 53 and 54 so as to constrain the dies 22 and 24 relative to each other. The key 55 and keyways 53 and 54 align the dies 22 and 24 but permit movement of the surfaces 51 and 52 toward and away from each other in a direction perpendicular to these surfaces and permit movement of the dies 22 and 24 with the surfaces 51 and 52 maintaining their parallel, spaced relationship. Coil compression springs 56 and 57 are received in bores 58 and 59 formed in the die 24 at the base of the keyway 54. The springs 56 and 57 engage the key 55 and normally urge the dies 22 and 24 away from each other.

The dies 23 and 25 also have respective surfaces 61 and 62 that face each other and which extend parallel to the surfaces 51 and 52 and normally to the surfaces 27 and 39, respectively. Keyways 63 and 64 are formed in the dies 23 and 25 adjacent the surfaces 61 and 62, respectively. A key 65 is received in the keyways 63 and 64. As with the key 55 and keyways 53 and 54, the key 65 and keyways 63 and 64 coact to constrain the dies 23 and 25 relative to each other while permitting movement of the surfaces 61 and 62 toward and away from each other in a direction perpendicular to these surfaces. In addition, the dies 23 and 25 may move relative to each other with the surfaces 61 and 62 moving in a direction parallel to these surfaces. Coil springs 66 are received in spaced bores 67 formed in the die 23 at the base of the keyway 63. The springs 66 engage the key 65 and urge the dies 23 and 25 away from each other.

The described die set is supported within the machine 21 within a cavity 71 formed by a main body portion 72 of the welding machine base. The dies 22 and 23 rest upon balls 73 that are supported in bores 74 at the base of the recess 71 and which are engaged by springs 75 positioned in these bores. The dies 22 and 23 are, therefore, urged upwardly into engagement with the accurately located lower surface of a respective one of a pair of retainer plates 76 and 77. The retainer plates 76 and 77 are held relative to the main body portion by means of wing nuts 78 that are threaded onto studs 79 which are fixed to the main body portion and extend upwardly through elongated apertures 81 formed in the respective plate 76 or 77.

The dies 24 and 25 are supported in the cavity 71 upon a plunger 82. The plunger 82 is reciprocally supported in a bore 83 formed in the body member 72 at the base of the cavity 71. The plunger 82, in turn, is supported upon an outstanding end 84 of a cut off lever 85. The cut off lever 85 is supported for pivotal movement by a pivot pin 86 (FIG. 1) that is staked to the main body portion 72. A spring 87 normally urges the cut off lever 85 in a counterclockwise direction so that the dies 24 and 25 are urged upwardly into engagement with a respective one of the plates 76 and 77.

Referring now specifically to FIG. 3, the dies 22 and 24 have inclined surfaces 91 and 92, respectively, which surfaces are engaged by cooperating surfaces 93 and 94 of a die actuating V-block, indicated generally by the reference numeral 95 (FIGS. 1 and 3). In a like manner, the dies 23 and 25 have inclined surfaces 96 and 97 that are engaged by cooperating surfaces 98 and 99 of a second die actuating V-block 101. The V-blocks 95 and 101 are supported for reciprocation within the cavity 71 between the retainer plates 76 and 77 and a horizontally extending surface 102 of the main body member 72.

The V-blocks 95 and 101 are formed with indentations 103 and 104 at their rear faces which are engaged by operating fingers 105 and 106 of a pair of operating levers 107 and 108, respectively. The operating levers 107 and 108 are pivotally supported relative to the main body member by pivot pins 109 an 111, respectively. A pair of face plates 112 and 113 having respective supporting legs 114 are secured to the main body member 72 in any known manner and enclose the operating mechanism including the operating levers 107 and 108.

The lower ends of the operating levers 107 and 108 carry pivot pins 115 and 116, respectively, which pivotally connect the operating levers to respective intermediate links 117 and 118. The opposite end of the links 117 and 118 are pivotally connected to operating members 119 and 121, respectively, by means of pivot pins 122 and 123. The operating members 119 and 121 are supported for reciprocation in a direction parallel to the direction of reciprocation of the die actuating V-blocks 95 and 101 within cavities 124 and 125 formed in the main body member 72.

The operating members 119 and 121 have inclined follower surfaces 126 and 127 that are engaged with a cam surface 128 of a first cam 129. The first cam 129 is supported for reciprocation within a vertically extending bore 131 formed in the main body member 72. The cam 129 is formed with a coaxial bore 132 through which a cylindrical portion 133 of an operating rod 134 extends. Adjacent the portion 133, the operating rod 134 is formed with a trunnion portion 135. The trunnion portion 135 is formed with an elongated slot 136 through which a pin 137 extends. The pin 137 is affixed to a bracket 138 of an operating handle assembly, indicated generally by the reference numeral 139. The bracket 138 is pivotally supported, by means of a pivot pin 141, within a recess 142 of the main body portion 72. The bracket 138 is formed with a tapped opening 143 into which a threaded operating handle portion 144 is received. The handle portion 144 has an elongated cylindrical shank 145 with a knob 146 disposed at its outer end.

Referring now to FIGS. 1 through 3, 11 and 12, a first inner pair of grippers 151 and 152 are juxtaposed to the first pair of dies 22 and 23. The grippers 151 and 152 are slidably supported in a transversely extending recess 153 formed in the main body portion 72. In a like manner, a second pair of grippers 154 and 155 are juxtaposed to the second pair of dies 24 and 25 and are supported for reciprocation in a transversely extending groove 156 of the main body portion 72. As will become more apparent as this description proceeds, the grippers 151 and 152 and 154 and 155 are disposed adjacent the respective dies 22 and 23 and 24 and 25 when the dies are in their retracted position. Compression springs 158 are disposed adjacent the outer ends of each of the grippers 151, 152, 154 and 155 around pins 159 for normally urging the grippers to their closed or gripping position.

The pair of grippers 151 and 152 are operated by means of a second cam member 161 having a pointed cam portion 162 that is adapted to extend between adjacent faces 163 and 164 of the grippers 151 and 152. The second cam member 161 is supported for reciprocation in a complementary recess 165 formed in the main body portion 72. A like cam member 166 is associated with the grippers 154 and 155 for operating these grippers. The cam member 166 is supported within a complementary recess 167 of the main body portion. The cam members 161 and 166 are interconnected by means of a longitudinally extending pin 168 that extends through respective openings 169 and 171 formed at the lower end of the cam members 161 and 166. The pin is held longitudinally in place by means of snap rings 173. Intermediate the cam members 161 and 166, the pin 168 is affixed to a rod 174. The rod 174 is received in a bore 175 formed in a sleeve 176 of a friction clutch. A friction member 177 is slidably supported in a transverse bore 178 of the sleeve 176 and engages the rod 174. A cantilevered leaf spring 179 engages the outer side of the friction member 177 for urging it into frictional engagement with the rod 174 thereby completing the friction clutch assembly. The lower end of the sleeve 176 is formed with a female threaded opening 181 in which a male threaded portion 182 of the operating rod 134 is received. The lower end of the sleeve 176 is also formed with a reduced diameter cylindrical portion 183 that is received in a complementary counterbore 184 of the first cam 129.

A first, outboard pair of grippers 191 and 192 is disposed outwardly of the grippers 151 and 152 and is slidably supported in a transversely extending groove 193 of the main body portion 72. Coil compression springs 194 encircle pins 195 fixed to each of the outer ends of the grippers 191 and 192 for urging the grippers 191 and 192 to their closed or gripping position. A like, second pair of outboard grippers 196 and 197 is disposed adjacent the grippers 154 and 155 and is also spring biased to its closed or gripping position. A pin 201 is affixed to each of the grippers 151, 152, 154 and 155. The pins 201 extend through an elongated opening 202 formed in a section 203 of the body member 72 between the respective gripper supporting grooves. Each pin 201 extends into an elongated recess 204 formed in the adjacent outboard gripper. That is, the pin 201 and grooves 204 form a lost motion connection between the gripper 151 and the gripper 191. In a like manner, a lost motion connection is provided between the gripper 152 and the gripper 192, between the gripper 154 and the gripper 196 and the gripper 155 and 197 by the respective pins 201 and grooves 204.

A wire locating and holding mechanism is provided for locating the ends of wires 211 and 212 wound upon spools 213 and 214, respectively. The locating and holding mechanism is incorporated so that the fine wires may be accurately positioned in the grooves 29 and 42 of the respective dies and so that the ends of the wires may be accurately sheared for subsequent butt welding. As has been noted, extremely fine wires are difficult to accurately thread through the openings in the dies and the locating and holding mechanism now to be described by particular reference to FIGS. 2 and 3 assists in the loading operation.

The locating and holding mechanism associated with the wire 211 comprises a first bullet-shaped locating member 215 that is fixed to an outwardly extending table portion 216 formed integrally with the main body member 72 on the side adjacent the first pair of dies 22, 23. The locating member 215 is formed with a groove 217 across which the wire 211 is adapted to be trained. A second bullet-shaped locating member 218 is affixed to an outwardly extending table portion 219 of the main body member 72 on the side adjacent the second pair of dies 24, 25. The locating member 218 is formed with a groove 221 that is aligned with the grooves 217 with the grooves 217 and 221 being aligned with the intermediate groves 29 and 42 formed in the dies 22, 23 and 24, 25 when these dies are in the position shown in FIG. 2.

A first holding device, indicated generally by the reference numeral 223, is juxtaposed to the bullet-shaped locating member 215. A second holding device 224 is juxtaposed to the bullet-shaped locating member 218. Each of the holding devices 223 and 224 is comprised of a shank portion 225 having an adjacent head 226 which terminates in a frustoconical section 227. The lower end of the frustoconical section 227 defines a shoulder 228. A frustoconical member 229 is formed with a bore 231 that is slidably supported upon the shank 225 and which defines a shoulder 232 in facing relationship with the shoulder 228. A coil spring 233 is received in a recess 234 in the member 229 and urges the shoulder 232 toward the shoulder 228. The shank 225 of the holding device 223 is directly affixed to the table 216 in any suitable manner.

The holding device 224 is slidably supported so as to apply a tension on the free end of the wire 211. To this end, a reduced diameter cylindrical portion 236 of the shank portion 225 extends through an elongated slot 237 formed in the table portion 219. A nut 238 is received on a threaded end 239 of the shank to preclude axial disengagement. A shoe 241 engages the cylindrical portion 238 and is, in turn, engaged by a coil compression spring 242. The spring 242 is received in a bore 243 formed in the main body portion and normally urges the holding device 224 away from the corresponding holding device 223. The shoulders 228 of the respective holding devices 223 and 224 lie in substantially the same plane as the grooves 217 and 221 of the locating devices for a reason which will become more apparent as this description proceeds.

A second set of locating devices 251 and 252 are mounted at opposite ends of the machine and slightly inboard of the locating devices 215 and 218. The locating devices 251 and 252 are also formed with grooves 253 and 254, respectively. The grooves 253 and 254 lie in a common plane with the lowermost grooves 31 and 43 of the respective pairs of dies when the dies are in the position shown in FIG. 2. Associated with the locating devices 251 and 252 are holding devices 255 and 256 which are similar in construction to the holding devices 223 and 224. The holding device 256 which is juxtaposed to the spool 214 and which is adapted to coact with the wire 212 is fixed relative to the machine 21 while the holding device 255 is spring biased away from the dies in a manner similar to that employed with the holding device 224.

As will become more apparent as this description proceeds, oscillation of the operating handle assembly 139 about its pivot point 141 causes reciprocation of the V-blocks 95 and 101 and movement of the pairs of dies 22, 23 and 24, 25 from a normal released position as shown in FIG. 9 toward each other to a gripping position as shown in FIG. 8. In addition, the pairs of dies move from a retracted position wherein their surfaces 51, 52 and 61, 62 are spaced from each other to a welding position wherein these surfaces are brought into abutting engagement. The degree of pivotal movement of the operating handle assembly 139 during this movement which is utilized to achieve a multiple upset cold weld is limited by a fixed stop 261 (FIGS. 1, 13 and 14). The fixed stop 261 is engaged by an abutment member 262 in the form of a collar that is slidably supported upon the handle portion 145. The collar 262 is connected by means of a smaller diameter tubular member 263 to a release knob 264. A coil spring 265 is tensioned between a pin 266 fixed to the abutment member 262 and a pin 267 affixed to the operating handle bracket 138 for urging the abutment member 262 into engagement with a collar 268 that is fixed to the handle portion 145 adjacent the bracket 138. Pivotal movement in a clockwise direction of the operating handle assembly 136 will be limited by engagement of the abutment member 262 with the fixed stop 261 as should be readily apparent.

The actual degree of movement of the dies 22, 23 and 24, 25 to their retracted, normally opened position is limited by means of a pair of stop pins 271 and 272 that are affixed to the operating members 119 and 121, respectively, and which extend outwardly from one side of enlarged apertures 273 and 274 formed in the main body portion 72. The pins 271 and 272 are adapted to engage stop surfaces 275 and 276 formed on a stop lever, indicated generally by the reference numeral 277. The stop lever 277 is pivotally supported upon a pivot pin 278 and has an operating portion 279 in the form of an elongated lever that is juxtaposed to the stop member 261 and to the abutment member 262. A coil spring 281 is tensioned between a pin 282 fixed to the machine base and a pin 283 that is affixed to the operating portion 279 of the stop lever 277. The spring 281 urges the stop lever 277 in a counter-clockwise direction so that a tang 284 formed integrally with the lever 277 is held in engagement with the end of an adjustment rod 285. The adjustment rod 285 has a threaded portion 286 received in a tapped hole 287 formed in the machine body 72 for axial movement of the rod 285 relative to the body 72. A knob 288 is affixed to the outer end of the adjustment rod 285 to facilitate this adjustment. In addition, a stop collar 289 is received on the threaded rod portion 286 and is adapted to be abuttingly engaged with a shoulder 291 of the body portion 72 for holding the adjustment rod 285 in its adjusted position.

The V-blocks 95 and 101 are normally urged to a retracted position by means of tension springs 295 and 296 (FIG. 1) that are affixed at one end to depending pins 297 and 298 fixed to the respective V-blocks. The opposite ends of the springs 295 and 296 are connected to pins 299 and 301 which are affixed to the operating levers 107 and 108, respectively, to normally bias these levers in a clockwise and counterclockwise direction, respectively.

OPERATION

In order to load the machine 21 to effect a multiple upset cold weld between the wires 211 and 212, the release knob 264 is grasped and pulled outwardly so the abutment member 262 will clear the stop pin 261. The operating handle assembly 139 is then rotated in a clockwise direction about the pivot pin 141 to the position shown in FIG. 14. Upon this movement, the operating rod 134 will be drawn downwardly until a shoulder 305 formed at the bottom of the frictional clutch member 176 engages an oppositely facing shoulder 306 formed at the base of the counterbore 184 of the first cam 129. The cam 129 is, therefore, drawn downwardly so that the springs 295 and 296 may urge the operating members 119 and 121 inwardly. The clockwise rotation of the operating handle assembly 139 will bring the abutment member 262 into engagement with the stop level operating portion 279 effecting rotation of the stop lever 277 in a clockwise direction about the pivot pin 278. The stop pins 271 and 272 carried by the operating members 119 and 121 will then register with cut outs 307 and 308 formed in the stop level 277 adjacent the stop surfaces 275 and 276. The operating members 119 and 121 are, therefore, free to move to a fully retracted position.

The tension springs 295 and 296 will act on the V-blocks 95 and 101 to cause these V-blocks to move and follow with the operating fingers 105 and 106 at the upper end of the operating levers 107 and 108. The die block springs 35, 47, 56, 57 and 66 are then free to urge the die blocks 22, 23 and 24, 25 away from each other so that a gap exists between the surfaces 26 and 27 of the die pair 22, 23 and between the surfaces 38 and 39 of the die pair 24, 25. As shown in FIG. 10, this gap is greater than the diameter of the wire to be welded so that a wire may be inserted between these surfaces of the die blocks.

When the die actuating V-blocks 95 and 101 are retracted, it is also essential that the grippers 151, 152, 154, 155, 191, 192, 196 and 197 be retracted so as to permit insertion of the wires 211 and 212. Each of the V-blocks 95 and 101 has recesses 321 formed in its opposite faces (FIG. 12) into which one end of the pin 201 extends. The recesses 321 form a lost motion connection with the pins 201 and after the V-blocks 95 and 101 are retracted sufficiently, the respective grippers will be retracted along with the V-blocks through the action of the V-block on the pins 201.

The wire 211 is stretched across the locating member grooves 217 and 221 and is snapped between the shoulders 228 and 232 of the holding devices 223 and 224. The conical surfaces 227 and 229 facilitate this insertion of the wire. At the same time, the holding device 224 is moved inwardly toward the die set compressing the spring 242. When the wire 211 is then released, the spring 242 will place a tension on the wire. As has already been noted, in this position the wire 211 is aligned with the smaller size grooves 29 and 42 of the respective dies 22, 23 and 24, 25. The wire 212 is then inserted in the holding devices 255 and 256 after being located by the locating devices 251 and 252 in a manner similar to that described in connection with the locating and holding of the wire 211. The wire 212 is then aligned with the larger size grooves 31 and 43 of the pairs of dies 22, 23 and 24, 25.

While the dies 22, 23 and 24, 25 are still in their opened positions, the pair of dies 24, 25 is depressed through the actuation of a die depressing lever, indicated generally by the reference numeral 322 (FIGS. 1 and 15). The die depressing lever is comprised of an offset or L-shaped lever arm 323 that is bifurcated and is pivotally supported, by pivot pins 324, on the machine 21. At the other end of the lever 323, an engaging member 325 is pivotally supported by means of a pivot pin 326. The member 325 has a pair of spaced gripper engaging portions 327 and 328 and an intermediate die engaging portion 329. When the die depressing mechanism 322 is pivoted about the pivot pins 324 into engagement with the dies, the dies 24 and 25 are engaged by the die engaging portion 329 and the gripper engaging portions 327 and 328 enter between the pairs of grippers 191, 192 and 196, 195. The lever 323 is pivoted until it fully engages the top plate 76 at which time the pair of dies 24, 25 is depressed so that the grooves 41 are aligned with the grooves 29 of the pair of dies 22, 23. The grooves 42 of the dies 24, 25 are, at this time, aligned with the grooves 31 of the dies 22, 23. The wire 211 will, therefore, be aligned with the grooves 41 and 29 and the wire 212 will be aligned with the grooves 42 and 31.

At this time, the operating handle assembly 139 is depressed and the abutment member 262 will be returned to the position shown in FIGS. 1 and 13 by the action of the spring 265. Upon depression of the operating handle assembly 139, the operating rod 134 will be moved upwardly. During initial upward movement of the operating rod 134, the first cam 129 will be held in its retracted position by means of a brake shoe 331 that engages the outer periphery of the first cam 129 and which is held in frictional engagement therewith by a coil spring 332 received in a counterbored opening 333 and reacting against a closure plug 334. Upon this upward movement, the shoulder 305 will move away from the shoulder 306 and a shoulder 335 formed at the top of the trunnion portion 135 will abuttingly engage an oppositely facing shoulder 336 formed at the bottom of the first cam 139. Continued downward movement of the operating handle assembly 139 will cause the first cam 129 to move upwardly driving the operating members 119 and 129 away from each other. This movement is transmitted through the operating levers 107 and 108 to inward movement of the die actuating V-blocks 95 and 101. The inclined faces 93, 94, 98 and 99 of the V-blocks 95 and 101 will, therefore, cause the dies of the pairs 22, 23 and 24, 25 to move toward each other through the sequence shown in FIGS. 10, 9 and 8. In addition, the pair of dies 22, 23 will move toward the pair of dies 24, 25 until the faces 51, 52 and 61, 62 are in abutment. It should be understood that the pair of dies 24, 25 is held depressed during this time and after completion of the downward movement of the operating handle assembly 139 the dies will be in the position shown in FIG. 5.

It should thus be readily apparent that the wire 211 will be received in the wire receiving cavity defined by the grooves 29 of the dies 22, 23 and will be loosely received in the cavity defined by the grooves 41 of the dies 24, 25. In a like manner, the wire 212 will be tightly gripped in the cavity defined by the grooves 42 of the dies 24, 25 and will be loosely received in the cavity defined by the grooves 31 of the dies 22, 23.

At this time, the die depressing mechanism 322 is returned to its inoperative position as shown in FIG. 1. The dies 24, 25 will be maintained in a depressed state by the friction between the V-blocks 95 and 101 and these dies.

When the die depressing mechanism 322 was maintained in its operative position, the grippers 191, 192 and 196, 197 were held in an opened position. The pins 201 which would, at that time, have traversed the slots 204 and also have caused retraction of the grippers 151, 152 and 154, 155 so that these grippers would not create any substantial frictional force upon the wire during the closing of the dies 22, 23 and 24, 25. The frictional clutch provided between the operating rod 133 and the second cams 161 will have permitted this holding open of the grippers while the V-blocks 95 and 101 move together. When the die depressing mechanism 322 is released, however, the coil springs 158 and 194 will cause them to move toward their engaged position.

The wires 211 and 212 are now sheared by depressing the cut off lever 85, which lever had previously been rotated in a counterclockwise direction due to the depression of the dies 24, 25. Depression of the cut off lever 85 causes a force acting through the plunger 81 urging the dies 24, 25 upwardly to the position shown in FIG. 4. The abutting surfaces 51, 52 and 61, 62 of the dies 22, 24 and 23, 25 effecting this cutting off of the wires 211 and 212. Cavities 341 and 342 formed in the respective die faces for receiving the flash during the multiple upset process as described in the aforenoted U.S. Pat. No. 3,106,013 will serve the function of facilitating shearing of the wires 211, 212. After the dies 24, 25 are elevated, their grooves 42 will be aligned with the grooves 29 of the dies 22, 23. The end of the wire 211 in the wire receiving cavity defined by the grooves 41 of the dies 24, 25 is scrap and may then be easily removed due to the relatively large dimension of this groove. The same is true with respect to the scrap end of the wire 212 which is received in the cavity defined by the grooves 31 of the pair of dies 22, 23. It will be noted that the grooves 28 and 43 serve no function during this process. The provision of these grooves, however, insures complete symetry so that the die set may be positioned in the butt welding apparatus 21 in either direction. The ends of the wires 211 and 212 received in the holding devices 223 and 256 is then released from these devices merely by pulling it outwardly. The thus sheared ends of the wires 211 and 212 are now welded together by a multiple upset welding technique of the type generally described in the aforenoted U.S. Pat. No. 3,106,013. In the butt welding machine 21, however, there are certain features not described in that application relating to the sequential operation of the dies and grippers.

After the wires 211 and 212 have been cut, the operating handle assembly 139 is pivoted in a clockwise direction until the abutment member 262 engages the stop 261. During this movement, the operating rod 134 is moved downwardly. Upon this downward movement, the friction clutch connects the operating rod to the second cams 161 and 166 causing their portions 162 to move from between the abutting gripper surfaces 163 and 164. The springs 158 then urge the grippers 151, 152, 154 and 155 into engagement with the respective wire ends 211 and 212. The downward movement of the second cams 161 and 166 continues until the pin 168 contacts the lower end of a slot 336 formed in a stop bracket 337 fixed to the body portion 72. At this time, the friction clutch will slip and the cams 161 and 166 will undergo no further downward movement. The pins 201 permit the springs 194 to move the grippers 191, 192, 196 and 197 into engagement with the wire. Initial downward movement of the operating rod 134 causes no movement of the first cam 129 since the frictional brake shoe 331 holds it in its uppermost position. Eventually, however, the shoulder 305 contacts the shoulder 306 and the first cam 129 moves downwardly whereupon the springs 295 and 296 retract the V-blocks 95 and 101. The springs 35, 47, 56, 57 and 66 of the die set then urges the dies apart. This retraction continues until the pins 271 and 272 contact the stop surfaces 275 and 276 on the stop lever 277. The actual degree of retraction of the dies will be dependent upon the position of the stop rod 285. The dies 22, 23 and 24, 25 are retracted to a position as shown in FIG. 9 wherein the dies may slide relative to the respective wire ends. The gap between the surfaces 26 and 27 and 38 and 39 of the respective die faces is less than the diameter of the wire, however, so that the wire cannot fall from within the cavity defined by the grooves 29 and 42. In addition to moving radially outwardly with respect to the wires, the die pairs 22, 23 and 24, 25 move away from each other. That is, these dies index with a portion of the wires 211, 212 rearwardly of that previously engaged.

Upon the next downward actuation of the operating handle 139, the dies 22, 23 and 24, 25 are again moved inwardly in the manner previously described and the grippers 151, 152, 154 and 155 are released. The dies 22, 23 and 24, 25 move inwardly to engage the respective wires 211 and 212 and the surfaces 51, 52, 61 and 62 of the die faces move to their welding position to cause an upset in the abutting ends of the wires. The upset material flows into the die cavities 341 and 342. The adjacent corners of the dies are relieved, as at 351, so that any flash from the weld which may be broken off will not interfere with the movement of the die surfaces 51, 52, 61 and 62 into abutment.

It should be readily apparent that the upsetting action is repeated until a good weld has been formed in the manner described in the aforenoted patents. After the wire has been welded, the release knob 264 is pulled outwardly and the operating handle mechanism 139 is moved upwardly so as to open the dies to the position shown in FIG. 10 so that the welded wire may be removed and another pair of wire ends may be inserted.

What is claimed is:

1. A die set for a fine wire butt welding machine comprising a first die, a second die, said first die and said second die having first respective facing surfaces, first and second wire receiving grooves formed in said first surfaces of each of said first and second dies, a first pin, a bore formed in each of said first and second dies and extending substantially normally to their respective first surfaces, said first pin being received in the bores of said first and said second dies for aligning the first and second wire receiving grooves of said dies with each other and for restraining movement of said first and said second dies relative to each other along the axis of said pin from an opened position to a gripping position wherein said first surfaces of said first and second dies are in abutting relationship, a third die, a fourth die, said third and said fourth dies having first respective surfaces, first and second wire receiving grooves formed in said first surfaces of each of said third and fourth dies, a second pin, a bore formed in each of said third and fourth dies and extending substantially normally to the first surfaces thereof, said second pin being received in said bores of said third and fourth dies for aligning said first and said second wire receiving grooves of said third die with those of said fourth die and for restraining movement of said third and said fourth dies relative to each other along the axis of said second pin from an opened position to a gripping position wherein said first surfaces of said third and said fourth dies are in abutting relationship, said first and said third dies having second respective facing surfaces, a first key, keyway means formed in said first and said third dies extending normally to said second facing surfaces and to said first and said second pins, said first key being received in said keyway means for restraining movement of said first and said third dies relative to each other in a first direction normally to the plane of said second surfaces with said second surfaces moving toward and away from each other, said keyway means extending longitudinally of said second surfaces for movement of said first and said second dies in a direction parallel to the plane of said second surfaces, said second and said fourth dies having second respective facing surfaces, a second key, keyway means formed in said second and said fourth dies extending normally to said second facing surfaces and to said first and said second pins, said second key being received in said keyway means of said second and said fourth dies for restraining movement of said second and said fourth dies relative to each other in a first direction normal to the plane of their second surfaces with said second surfaces moving toward and away from each other, said keyway means of said second and said fourth dies extending longitudinally of their second surfaces for movement of said second and said fourth dies in a direction parallel to the plane of said second surfaces.

2. A die set as set forth in claim 1 further including first spring means for urging the first surfaces of the first and second dies away from each other toward their opened position, second spring means for urging the first surfaces of the third and fourth dies away from each other toward their opened position, third spring means for urging the second surfaces of the first and third dies away from each other, and fourth spring means for urging the second surfaces of the second and fourth dies away from each other.

3. A die set as set forth in claim 2 wherein the first and second spring means comprise respective coil springs encircling the first and second pins, respectively, the respective bores of the dies being counterbored for receiving said first and second coil springs.

4. A die set as set forth in claim 2 wherein the third and fourth spring means comprise third and fourth respective springs received in one of the keyway means and engaging the respective of the first and second keys.

5. A die set as set forth in claim 4 wherein the first and second spring means comprise first and second coil springs encircling, respectively, the first and second pins, the respective bores of said dies being counterbored for receiving said coil springs.

6. A die set as set forth in claim 1 wherein the second wire receiving grooves of each of the dies are substantially larger than the first wire receiving grooves.

7. A die set as set forth in claim 1 wherein the second surfaces of each of the dies is relieved adjacent the first groove therein for facilitating a metal forming operation.

8. A die set as set forth in claim 7 wherein the reliefs are formed adjacent the first grooves in the first surfaces.

9. A die set as set forth in claim 7 wherein the second surface of each of the dies extends substantially normally to the first surface thereof, said first and second surfaces of at least two of said dies being relieved at their juncture whereby metal flash will not interfere with movement of said dies toward their fully closed position with the respective first and second surfaces thereof being in abutting relationship with each other.

* * * * *